No. 880,857. PATENTED MAR. 3, 1908.
H. J. BOECKMAN.
MEAT RACK.
APPLICATION FILED MAY 20, 1907.

2 SHEETS—SHEET 1.

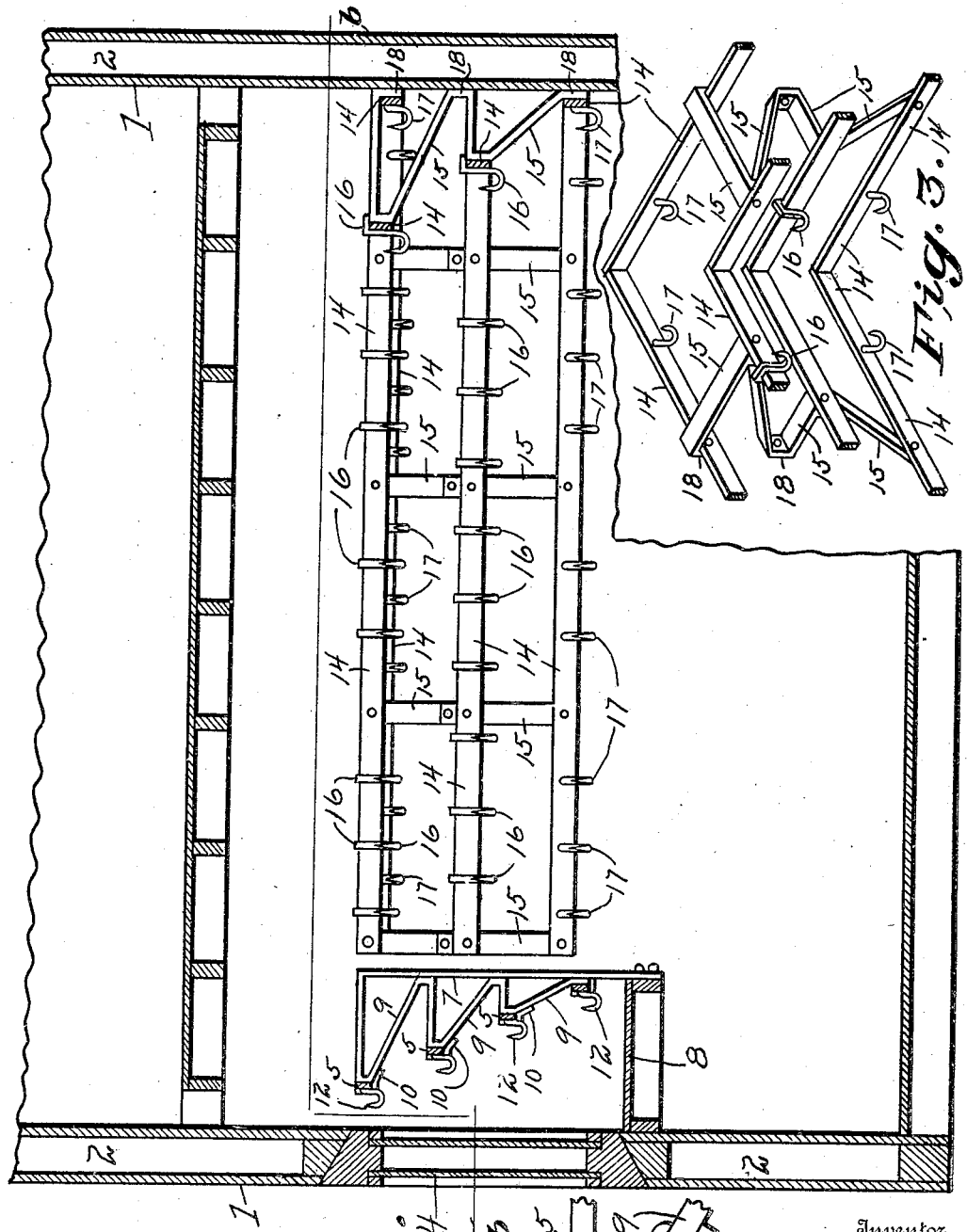

UNITED STATES PATENT OFFICE.

HENRY J. BOECKMAN, OF DAYTON, OHIO.

MEAT-RACK.

No. 880,857.  Specification of Letters Patent.  Patented March 3, 1908.

Application filed May 20, 1907. Serial No. 374,599.

*To all whom it may concern:*

Be it known that I, HENRY J. BOECKMAN, a citizen of the United States, residing at Dayton, in the county of Montgomery and State of Ohio, have invented certain new and useful Improvements in Meat-Racks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in meat racks of the type used by butchers in retailing meat.

The invention comprises a novel construction and arrangement of the various meat racks so employed.

The object of the invention is to provide a series of meat racks which enable the hanging of the various cuts of meat in a manner which prevents their coming in contact, and which arrangement admits of the utilizing of maximum space in the refrigerator or other place without bringing the various cuts of meat in touching contact and a free circulation of cold air.

Preceding a more detailed description of the invention, reference is made to the accompanying drawings, of which—

Figure 1:
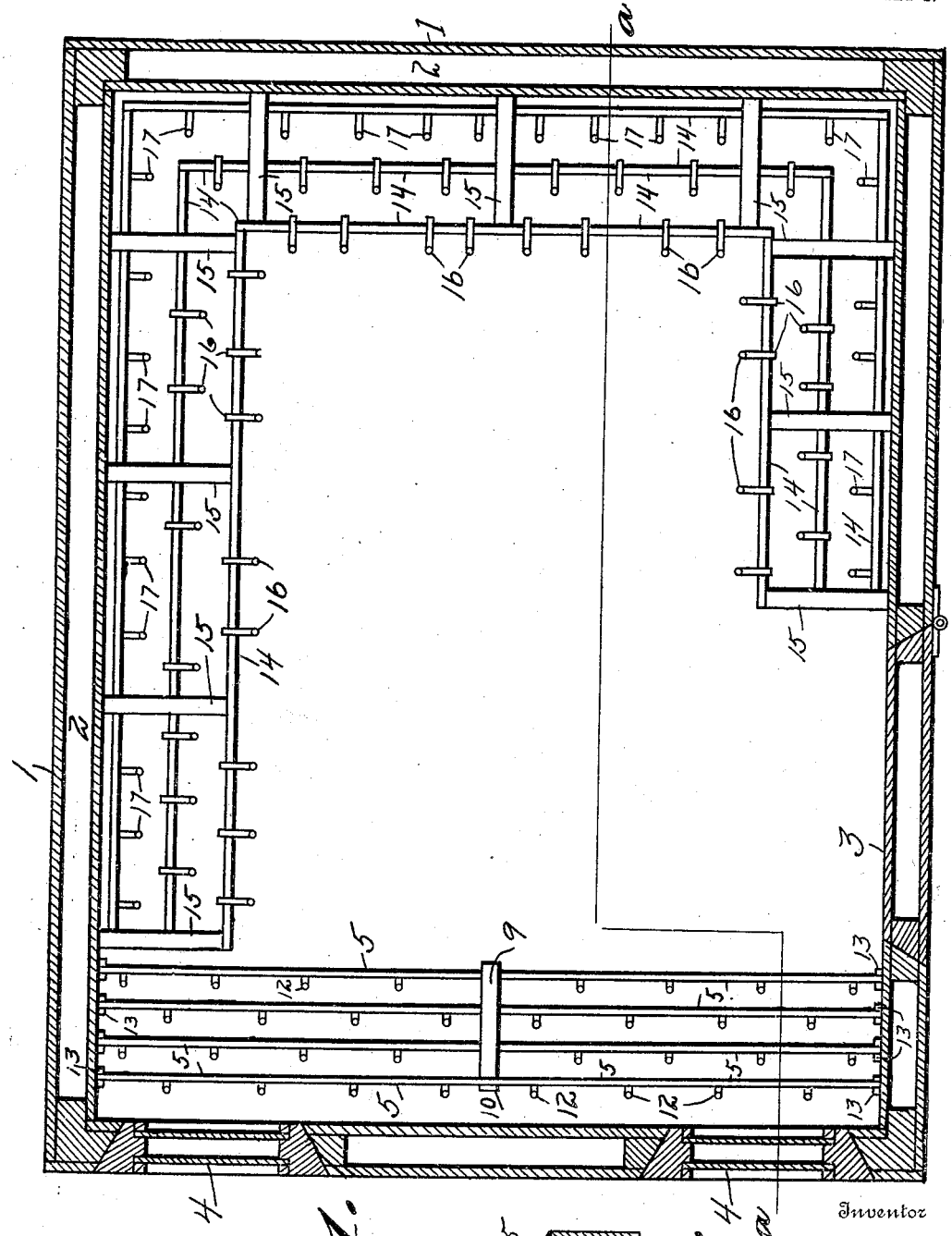
Figure 5:
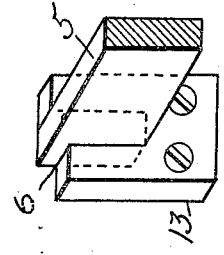

Figure 1, is a transverse horizontal section on the line *b b* of Fig. 2 and on a plane above the meat racks. Fig. 2, is a vertical section on the line *a a* of Fig. 1. Fig. 3, is a detail perspective view of the racks at a corner. Fig. 4, is a sectional view of one of the horizontal bars which support the meat hooks of the steak racks. Fig. 5, is a detail view of the end supports of the horizontal bars of the steak racks.

In a detail description of the invention, similar reference characters indicate corresponding parts.

The refrigerator 1 is of any desirable dimensions to enable a person to freely enter the same to hang the various cuts of meat in position on the racks. The walls of the refrigerator are provided throughout with the usual cold air spaces 2 and with a door 3 through which entrance is had to the interior of the refrigerator. The side of the refrigerator exposed to the view of the customers is provided with a suitable number of doors 4 with glass panels through which the smaller cuts of meat, such as steaks, may be seen by persons entering the store. These smaller cuts of meat, such as steaks, roasts, etc. are suspended upon what may be termed the steak rack. This steak rack consists of a series of horizontal metallic bars 5 which are mounted out of vertical alinement one with the other after the manner of steps as shown in Fig. 2, in order that the cuts of meat may be suspended in positions readily accessible through the doors 4 and free from contact with each other. The metallic bars 5 are supported at their ends in pockets 6 in lugs 13, the latter being fastened to the walls of the refrigerator at suitable points. Supporting this arrangement of horizontal bars 5 at their intermediate points is a series of brackets 9 of graduated sizes; these graduated brackets 9 are integrally joined to each other and to an upright back portion 7 which is attached at its lower end to a shelf 8 immediately on the interior of the refrigerator in the vicinity of the doors 4 4. Each of said graduated brackets lies inwardly from the plane of the next adjacent upper brackets and at the projected end of each bracket there is a pocket 6 formed by a second bracket 10 which is united to the main brackets 9 by means of rivets or bolts 11.

Arranged at suitable points along the metallic bars 5 are rigid meat hooks 12 upon which are suspended the steaks or other smaller cuts of meat which are more frequently drawn upon in dispensing to the retail trade. On the other interior sides of the refrigerator there is arranged a series of graduated meat racks to support the larger cuts of meat, such for example, as halves and quarters; these racks consist of a series of fixed horizontal bars 14 supported upon a series of angular graduated brackets 15 integrally joined and secured at their inner angles 18 to the adjacent side walls of the refrigerator. These brackets 15, together with the rack bars 14 are designed, as before stated, for the heavier cuts of meat and the said brackets are so graduated in their angles as to support the bars 14 out of alinement one with the other. As before stated, the rack bars 14 have a fixed connection with the respective brackets 15, and upon each series of brackets there are three of such bars mounted, and a fourth bar is mounted inwardly at the upper end of the bracket in proximity to the wall. These two upper bars 14 are thus approximately in the same plane but stand apart to such an extent as to permit access to the rearward bar. The upper-inwardly lying bar 14 and the lower-inwardly lying bar 14 have fixed to them a series of meat hooks 17, while the two outwardly-lying bars 14 have mounted upon them a series of movable meat hooks 16 which are supported on said bars at suitable points by over-lapping the bars. It will be observed that this arrangement of hooks enables the suspension of cuts of meat either in fixed positions or in positions to be selected in hanging the meat; for example, the inner series of fixed meat hooks 17 are first filled or supplied with the necessary cuts of meat, for example, those to be drawn upon later; after this placing of the cuts of meat the movable meat hooks 16 are placed at the desired points for the subsequent hanging of meat, and all the meat is prevented from making contact and a free circulation of cold air takes place.

I claim:

1. A series of meat racks adapted to support smaller cuts of meat and consisting of a series of horizontal bars supported out of vertical alinement one with the other and in end pockets, a series of integrally-joined brackets supporting said bars at intermediate points in pockets provided in the outer ends of said brackets, a series of racks adapted to support the larger cuts of meat, each of said racks consisting of a plurality of horizontal bars, a series of graduated brackets integrally joined and graduated to support the lower bars out of vertical alinement with the upper bars, the two upper bars being supported in the same horizontal plane with one in the rear of the other, a series of rigid hooks supported upon the upper rearward bar and the lower bar, and two series of movable hooks supported upon the two outwardly-lying bars, substantially as specified.

2. A series of meat racks, one of said racks consisting of a series of horizontal bars mounted at their ends in pockets and out of vertical alinement one with the other, a series of integrally-joined graduated brackets supporting said bars at intermediate points, the said brackets terminating in a vertical portion by which they are attached to a supporting member, a second series of racks consisting of four horizontal bars, the upper two of which are mounted in the same horizontal plane one in the rear of the other, and the two lower bars are mounted out of vertical alinement with the upper forward bar, a plurality of graduated supporting brackets for said bars each consisting of a series of integrally-joined brackets secured to the adjacent wall of the housing at their bases, the upper rearward bar being attached to the upper portion of the brackets adjacent to the supporting wall, the upper outward bar being attached to the upper front angles of the brackets, the next adjacent lower bar being attached to the brackets in a plane between the two upper bars, and the lower bar being attached to the lower inner angle of the brackets in a vertical plane with the upper rearward bar, the two front bars being provided with a series of movable meat hooks, and the two rearwardly-lying bars being provided with a series of fixed meat hooks, as herein shown and described.

In testimony whereof I affix my signature, in presence of two witnesses.

HENRY J. BOECKMAN.

Witnesses:
 R. J. McCarty,
 C. M. Theobald.